United States Patent [19]

Lee et al.

[11] Patent Number: 5,432,257

[45] Date of Patent: Jul. 11, 1995

[54] PROCESS FOR MANUFACTURING A POLYSULFIDE POLYMER FROM THE HEAVY ENDS WASTE OF CHLORINATED HYDROCARBON PRODUCTION

[75] Inventors: Chester Lee, North Plainfield, N.J.; Tao C. Chang, Port Lavaca, Tex.; Yung-Hui Huang, Parsippany, N.J.

[73] Assignee: Formosa Plastics Corporation, Livingston, N.J.

[21] Appl. No.: 329,532

[22] Filed: Oct. 26, 1994

[51] Int. Cl.$^6$ .............................................. C08G 75/14
[52] U.S. Cl. ................................... 528/373; 528/381; 528/389
[58] Field of Search ........................ 528/373, 381, 389

[56] References Cited

U.S. PATENT DOCUMENTS

| | | | |
|---|---|---|---|
| 2,466,963 | 6/1945 | Patrick et al. | 260/79.1 |
| 3,101,326 | 8/1963 | Montenne | 260/43 |
| 4,025,495 | 5/1977 | Peerts et al. | 260/79 |
| 4,102,874 | 7/1978 | Peerts et al. | 528/387 |

*Primary Examiner*—Mark Sweet
*Attorney, Agent, or Firm*—Kenneth P. Glynn; Stephen J. Driscoll

[57] ABSTRACT

A process is disclosed for preparing a polysulfide polymer using a heavy ends waste generated in chlorinated hydrocarbon production. The process involves first pretreating the heavy ends waste by an enriching process to form an enriched heavy ends waste with an ethylene dichloride content less than 10% by weight. The enriched heavy ends waste is then reacted with alkaline polysulfide within a temperature range of 50° C. to 150° C. to form a polysulfide polymer.

18 Claims, No Drawings

PROCESS FOR MANUFACTURING A POLYSULFIDE POLYMER FROM THE HEAVY ENDS WASTE OF CHLORINATED HYDROCARBON PRODUCTION

BACKGROUND OF THE INTENTION

1. Field of the Invention

This invention relates both to solving the disposal problem of heavy ends waste generated from the manufacture of chlorinated hydrocarbons such as ethylene dichloride and/or vinyl chloride, and to producing an organic polysulfide polymer mixture having low odor. This modified polysulfide polymer mixture is derived from the heavy ends waste using an enrichment technique to reduce the ethylene dichloride content.

2. Information Disclosure Statement

The polymerization of inorganic polysulfides with polyfunctional organic compounds is well known in the art. U.S. Pat. No. 1,890,191, teaches that suitable polyfunctional compounds which are alkyl dihalides polymerize with metal polysulfide to form a linear polysulfide polymer. The preferred polyfunctional monomers are dichloroethane, ethylene dichloride, dichloroethyl ether, dichloroethyl formal and trichloropropane and/or their mixtures and the preferred metallic polysulfide is sodium polysulfide. The commercial polysulfide polymers currently available are synthesized from dichloroethyl formal with a small amount of trichloropropane. Polysulfide polymers derived from other materials usually emit an offensive odor thereby limiting their use.

Although many patents teach the production of polysulfide polymer from pure starting chemicals and/or their mixtures, very few process use heavy ends waste as a raw material. U.S. Pat. Nos. 4,025,495 and 4,102,874 in 1977 and 1978 respectively disclosed converting a heavy residue derived from vinyl chloride manufacture into an organic polysulfide polymer. The obnoxious odor produced from such a polysulfide polymer, however, limits its application. Consequently, this product and the processes of making it have never been commercially utilized.

In 1949, U.S. Pat. No. 2,466,963 disclosed an improved process to prepare a liquid polysulfide polymer. The high molecular weight polysulfide polymer formed by reacting an alkaline polysulfide with a mixture of bis-2-chloroethyl formal and 1,2,3,-trichloropropane is reductively cleaved or split with sodium hydrosulfide and sodium sulfate to form a lower molecular weight material with essentially all disulfide linkages. The liquid polysulfide polymer obtained from this process, however, contains low molecular weight mercaptan compounds with undesirable odors. These odors generally limit the application of liquid polysulfide polymer sealant to well ventilated areas.

A number of disclosures relate to methods of reducing the unpleasant odor associated with the polysulfide polymer. For example, in 1963, U.S. Pat. No. 3,101,326 claimed that styrene oxide can be utilized as an effective masking agent to reduce or eliminate the offensive mercaptan odor of a polysulfide polymer. The reaction of polysulfide with styrene oxide, however, may affect the physical and/or chemical properties of polysulfide polymer and consequently limit its application to certain end cured products.

Therefore, a need exits to produce a low odor polysulfide polymer from the heavy end waste of chlorinated hydrocarbon 10 production. The present invention fulfills this need.

SUMMARY OF THE INVENTION

The present invention is directed at both solving the disposal problem of heavy ends waste generated from the manufacture of chlorinated hydrocarbons such as ethylene dichloride and/or vinyl chloride, and producing an organic polysulfide polymer mixture having low odor. To this end, the process involves first pretreating the heavy ends waste by an enriching process to form an enriched heavy ends waste with an ethylene dichloride content less than about 10% by weight. The enriched heavy ends waste is then reacted with alkaline polysulfide within a temperature range of about 50° to about 150° C. to form a polysulfide polymer.

These and other features, aspects, and advantages of the present invention will become better understood with reference to the following description and appended claims.

DETAILED DESCRIPTION OF THE INVENTION

The present invention discloses a process for manufacturing a useful, low odor, polysulfide polymer mixture from the heavy ends waste of chlorinated hydrocarbon production. Using enriched heavy ends waste rather than pure starting materials not only reduces raw material costs dramatically, but also resolves a waste disposal problem.

The heavy ends waste is generated from the distillation and/or purification of chlorinated hydrocarbons such as ethylene dichloride and/or vinyl chloride. It consists of a mixture of various organic chlorinated hydrocarbons. An analysis of heavy ends wastes obtained from several plant sites has shown a predominance of mixtures of short chain chlorinated hydrocarbons including 1,2-dichloroethane, 1,1,2-trichloroethane, 1,1,2,2-tetrachloroethane and perchloroethylene. These highly chlorinated aliphatics generally range between 40 and 70% by weight of the total chlorinated organic compounds. The other components of the heavy ends waste include different chlorinated aromatic and cycloaliphatic compounds such as chlorobenzene, dichlorobenzene, chloroxylenes and dichlorocyclohexadiene. The relative percentages of these compounds depends on the purity of the raw materials used in the process as well as the plant operating conditions.

Since these chlorinated or polychlorinated hydrocarbons pose a high risk to human health, traditionally they were either incinerated or recovered as a chlorinated organic solvent. These methods, however, suffer several shortcomings. For example, the high temperature of incineration creates dioxane—a highly toxic atmospheric pollutant. Incineration is consequently strictly regulated-and limited by law. Recovery of chlorinated solvent is also constrained by environmental concerns. Thus, the present invention provides an alternative process to treat the heavy ends 10 waste generated from chlorinated hydrocarbon production.

The high quantity of di-chloro or poly-chloro compounds found in the heavy ends waste allows it to be polymerized with alkaline polysulfide to form polysulfide polymer. Polysulfide polymer derived from this material, however, emits a strong mercaptan odor which limits its use. This odor is attributed to the presence of low molecular weight dihalides in the reactants.

During polysulfide synthesis, these dihalides form dithiols and stable and/or polymerizable cyclic compounds. The greater the amount of these low molecular weight dihalides in the starting materials, the stronger the odor after the reaction has been completed. The present invention teaches a process to avoid this unpleasant odor.

The present invention relates to a process for preparing a polysulfide polymer using the heavy ends waste generated by chlorinated hydrocarbon production. The process first involves pretreating the heavy ends waste using an enriching process. The enriching process forms an enriched heavy ends waste with an ethylene dichloride content less than about 10% by weight. Next, the enriched heavy ends waste are reacted with alkaline polysulfide within a temperature range of about 50° C. to about 150° C. This process not only separates most of the low molecular weight components from the heavy ends waste to produce low odor polysulfide polymer mixtures, but also enriches the polyhalogenated compounds to create polymer chains with enhanced cross-linking. This can impart the polymer with excellent resistance to certain chemicals and solvents.

The enrichment technique is well known in the separation and purification industry. It involves any traditional distillation process for reducing the ethylene dichloride concentration in the heavy ends waste. This concentration is typically about 10–40% by weight of heavy ends waste obtained from a storage tank. By reducing the ethylene dichloride concentration below about 10% by weight, a reduction in odor of the polysulfide polymer is realized. This odor reduction becomes much more significant when the concentration is below about 5%. Moreover, for optimum odor reduction, an ethylene dichloride concentration of less than about 1% by weight is preferred.

In one preferred embodiment, an enriched heavy ends waste with an ethylene dichloride content less than 1% is added to an aqueous sodium polysulfide solution prepared at temperatures of 70° C. to 80° C. Different ranks of aqueous sodium polysulfide solution can be prepared by adding sulfur to aqueous sodium sulfide solution while agitating and maintaining a temperature range of 70° to 80° C. until a homogeneous solution forms. Alternatively, various ranks of sodium polysulfide solution can be prepared by adding sulfur to a caustic soda solution under the same conditions.

Liquid polysulfide polymer mixtures with rank from one to five are prepared by reacting a stoichiometric amount of the enriched heavy ends waste with a slight excess of sodium polysulfide in the presence of water as a suspension medium. The stoichiometric amount of mineral polysulfide is defined as two atoms of alkali metal to two atoms of chlorine atoms present in the heavy ends waste. Although using mineral polysulfide higher than the stoichiometric values has no detrimental effect on the polysulfide polymer, it is not economical to use sodium polysulfide higher than 130% by weight of the molar theoretical quantity. Liquid polysulfide polymer mixtures with rank from one to five are also prepared by reacting stoichiometric amounts of the enriched heavy ends waste with sodium polysulfide solution lower than the stoichiometric values. Under these conditions, however, a significant amount of heavy ends waste may not react.

According to the present invention, different ranks of organic polysulfide polymer mixtures are obtained from the enriched heavy ends waste. The modified polysulfide polymers so-obtained are black liquid mixtures of various organic polysulfides with significantly low mercaptan odor. Alternatively, the invention provides for the production of different ranks of polysulfide polymer mixtures by reacting the sodium polysulfide with the enriched heavy ends waste in the presence of a dispersion agent. Metallic hydroxides such as ferrous, aluminum, calcium and magnesium hydroxides can be used as dispersion agents. In one embodiment, magnesium hydroxides are prepared in situ by dissolving the magnesium chloride in a basic water medium.

Since the dispersion polymerization of organic dihalides with alkaline polysulfide is exothermic, the enriched heavy ends waste must be introduced slowly into the aqueous sodium polysulfide solution. The heavy end waste is added to the solution within a range of about 15 minutes to about two hours while stirring. In a preferred embodiment, the waste is added within about 15 minutes to about one hour while maintaining the mixture's temperature between about 80° C. and about 100° C. The reaction mixture is then reacted for about one to about eight hours, and preferably for about one to about four hours with consistent agitation to achieve a complete reaction.

The modified polysulfide polymer derived from the enriched heavy ends waste has commercial utility, but nevertheless can be further refined using any purification technique. One such technique involves separating precipitated polysulfide polymer from the reaction mother liquor by any suitable separation technique such as repeated water washing and decanting. Sodium chloride is the major by-product of this separation. The polysulfide polymer is then coagulated by acidifying it to a pH below 5. In one embodiment, a dilute solution of hydrochloric acid is used. Finally, the polysulfide polymer is liberated by decanting it from the supernatant water.

The polysulfide polymer prepared from this process lends itself to many applications. Its high resistance to chemicals and solvents makes it useful in coating applications. Moreover, the adhesive properties of the polysulfide polymer allow it to function well in applications ranging from a solid rocket fuel binder to a concrete repair material. Its flexible nature and tolerance to severe temperature cycles also make it useful in the construction and transportation industries. In addition to these applications, polysulfide polymer can also be reacted with epoxy resins. Recent advances in the polysulfide-epoxy technology have enabled the coating and adhesive industries to use a liquid polysulfide polymer as an elastomeric modifier in an epoxy resin matrix. Incorporating liquid polysulfide polymer into epoxy resin reduces viscosity, enhances adhesion, introduces flexibility, and improves resistance to chemicals and solvents. Thus, according to the present invention, the environmentally hazardous heavy ends waste can now be converted into a useful polysulfide polymer without the associated problem of offensive odor.

Obviously, numerous modifications and variations of the present invention are possible in the light of the above teachings. It is therefore understood that within the scope of the appended claims, the invention may be practiced otherwise than as specifically described herein.

EXAMPLE 1

Enriched heavy ends waste obtained as a residue after fractional distillation was analyzed by gas chromatography. The composition by weight was as follows:

35.19% of 1,1,2-trichloroethane, 0.11% of 1,2-dichloroethane, 12.10% of chlorobenzene, 1.49% of 1,1,2,2-tetrachloroethane, 0.06% of perchloroethylene, and 51.05% of remaining chlorohydrocarbons (lumped as a single component in this analysis).

A sodium polysulfide solution having a rank of sulfur equal to 2.0 was prepared by the following process: 169.0 g of technical sodium sulfide containing 60% by weight of $Na_2S$ and 41.6 g of sulfur were added into 650 ml of water in a flask equipped with an agitator; next, the mixture was heated to 70° C. while agitating until the solution was homogeneous. The final concentration of sodium polysulfide solution was 2M and the stoichiometric ratio between sodium polysulfide and enriched heavy ends waste was 1.3.

In a reaction vessel filled with the aqueous sodium polysulfide solution, 120 g of enriched heavy ends waste were slowly added into the reaction vessel within 30 minutes. The reaction temperature was maintained at 105° C. while the reaction medium was agitated continuously for five hours.

After the end of the reaction, 124 ml of concentrated HCl solution (36.5%) was added to the reaction mixture. The coagulated polymer was washed with 200 ml of water. A viscous black polymer liquid with a low mercaptan odor was obtained. The resultant product weighed 239.3 g.

EXAMPLE 2

Heavy ends waste obtained directly from the heavy ends storage tank was analyzed by gas chromatography. The composition by weight was as follows: 25.96% of 1,1,2-trichloroethane, 12.62% of 1,2-dichloroethane, 1.97% of chlorobenzene, 0.81% of 1,1,2,2-tetrachloroethane, 0.16% of perchloroethylene, and 58.48% of remaining chlorohydrocarbons (lumped as a single component in this analysis).

The procedure described in Example 1 was repeated by treating the hereinabove heavy ends waste. The resultant product was black and had a very unpleasant odor. It weighed 196.5 g.

EXAMPLE 3

The enriched heavy ends waste used in Example 1 was treated in the presence of a dispensing agent according to the following process:

77.0 grams of technical sodium sulfide containing 60% by weight of $Na_2S$ and 19.0 g of sulfur were added into 650 ml of water to prepare an aqueous sodium polysulfide solution having a rank of sulfur equal to 2.0;

The mixture was then heated to 70° C. with agitation until the solution was homogeneous.

In a reaction vessel filled with the aqueous sodium polysulfide solution, an in-situ dispensing agent, $Mg(OH)_2$, was used by adding 31.8 g of magnesium chloride hexahydrate and 12.5 g of 5N NaOH solution into the aqueous solution.

50 grams of enriched heavy ends waste were then slowly added into the reaction vessel within 30 minutes. The reaction temperature was maintained at 105° C. while the reaction medium was agitated continuously for eight hours.

After the reaction, the precipitated polymer was separated from the reaction mother liquid. The resultant powder was pasty and dark with no significant-mercaptan odor. It weighed 62.4 g.

EXAMPLE 4

Example 1 was repeated but using a different procedure to separate the polysulfide polymer from the reaction mother liquid.

After the end of the reaction, 200 ml of toluene was added into the reaction mixture. The polysulfide polymer was dissolved in the toluene and separated from the reaction mother liquid. After air dried, the resultant product was pasty and black with no significant mercaptan odor. It weighed 219.2 g.

EXAMPLE 5

Example 1 was repeated by treating the same enriched heavy ends waste with a sodium polysulfide solution having a rank of sulfur equal to 3.5. After the reaction was completed, the reaction mother liquid was decanted and the polymer was washed by 200 ml of water. The resultant product was pasty and black with no significant mercaptan odor. It weighed 241.5 g.

EXAMPLE 6

Example 1 was repeated by treating the same enriched heavy ends waste with a sodium polysulfide solution having a rank of sulfur equal to 5.0. After the reaction, the reaction mother liquid was decanted and the polymer was washed by 200 ml of water. The resultant product was a black mastic gum with no significant mercaptan odor. It weighed 256.3 g.

What is claimed is:

1. A process for preparing a polysulfide polymer using a heavy ends waste generated in chlorinated hydrocarbon production, said process comprises:
    a. distilling said heavy ends waste to form an enriched heavy ends waste with an ethylene dichloride content less than 10% by weight; and
    b. reacting said enriched heavy ends waste with alkaline polysulfide within a temperature range of about 50° to about 150° C. to form a polysulfide polymer.

2. The process of claim 1 wherein said alkaline polysulfide is an alkali metal polysulfide solution selected from the group consisting of sodium polysulfide solution and potassium polysulfide solution.

3. The process of claim 2 wherein reacting said enriched heavy ends waste with said alkali metal polysulfide solution comprises slowly adding said enriched heavy ends waste to said alkali metal polysulfide solution within about 15 minutes to about 2 hours while stirring and maintaining a temperature range of about 80° to about 100° C.

4. The process of claim 2 wherein reacting said enriched heavy ends waste with said alkali metal polysulfide solution is performed with an excess stoichiometric amount of alkali metal polysulfide solution.

5. The process of claim 1, which further comprises:
    c. purifying said polysulfide polymer.

6. The process of claim 5, wherein purifying said polysulfide further comprises:
    i. separating precipitated polysulfide polymer from the reaction mother liquor;
    ii. coagulating said polysulfide polymer by acidifying it to a pH below about 5; and
    iii. liberating said polysulfide polymer by decanting it from the supernatant water.

7. The process of claim 1 wherein said enriched heavy ends waste has an ethylene dichloride content less than 1% by weight.

8. The process of claim 7 wherein said alkaline polysulfide is an alkali metal polysulfide solution selected from the group consisting of sodium polysulfide solution and potassium polysulfide solution.

9. The process of claim 8 wherein reacting said enriched heavy ends waste with said alkali metal polysulfide solution comprises slowly adding said enriched heavy ends waste to said alkali metal polysulfide solution within about 15 minutes to about 2 hours while stirring and maintaining a temperature range of about 80° to about 100° C.

10. The process of claim 8 wherein reacting said enriched heavy ends waste with said alkali metal polysulfide solution is performed with an excess stoichiometric amount of alkali metal polysulfide solution.

11. The process of claim 7, which further comprises:
c. purifying said polysulfide polymer.

12. The process of claim 11, wherein purifying said polysulfide further comprises:

i. separating precipitated polysulfide polymer from the reaction mother liquor;
ii. coagulating said polysulfide polymer by acidifying it to a pH below about 5; and
iii. liberating said polysulfide polymer by decanting it from the supernatant water.

13. The polysulfide polymer formed by the process of claim 7.

14. The polysulfide polymer formed by the process of claim 8.

15. The polysulfide polymer formed by the process of claim 9.

16. The polysulfide polymer formed by the process of claim 10.

17. The polysulfide polymer formed by the process of claim 11.

18. The polysulfide polymer formed by the process of claim 12.

* * * * *